(12) United States Patent
Kiwaki et al.

(10) Patent No.: US 10,906,358 B2
(45) Date of Patent: Feb. 2, 2021

(54) PNEUMATIC TIRE

(71) Applicant: BRIDGESTONE CORPORATION, Tokyo (JP)

(72) Inventors: Yukihiro Kiwaki, Higashimurayama (JP); Shungo Fujita, Kunitachi (JP)

(73) Assignee: BRIDGESTONE CORPORATION, Tokyo (JP)

( * ) Notice: Subject to any disclaimer, the term of this patent is extended or adjusted under 35 U.S.C. 154(b) by 484 days.

(21) Appl. No.: 15/576,388

(22) PCT Filed: Apr. 25, 2016

(86) PCT No.: PCT/JP2016/002176
§ 371 (c)(1),
(2) Date: Nov. 22, 2017

(87) PCT Pub. No.: WO2016/194292
PCT Pub. Date: Dec. 8, 2016

(65) Prior Publication Data
US 2018/0170113 A1    Jun. 21, 2018

(30) Foreign Application Priority Data

Jun. 3, 2015  (JP) ................................. 2015-113382
Jun. 3, 2015  (JP) ................................. 2015-113393

(51) Int. Cl.
*B60C 11/11* (2006.01)
*B60C 11/12* (2006.01)
(Continued)

(52) U.S. Cl.
CPC ...... *B60C 11/1204* (2013.01); *B60C 11/0306* (2013.01); *B60C 11/0309* (2013.01);
(Continued)

(58) Field of Classification Search
CPC ..... B60C 11/11; B60C 11/12; B60C 11/1204; B60C 11/1236; B60C 11/1353;
(Continued)

(56) References Cited

U.S. PATENT DOCUMENTS 7,093,631 B2     8/2006  Colombo et al.
2003/0111150 A1*  6/2003  Zimmer ................ B60C 11/00
                                                           152/209.19
(Continued)

FOREIGN PATENT DOCUMENTS

AU      2011309648 B2    2/2015
CN         1860040 A    11/2006
(Continued)

OTHER PUBLICATIONS

Machine translation for Europe 1695844 (Year: 2020).*
(Continued)

*Primary Examiner* — Steven D Maki
(74) *Attorney, Agent, or Firm* — Kenja IP Law PC

(57) ABSTRACT

A pneumatic tire comprising on a tread surface 1 a plurality of blocks 7, wherein: the blocks have an inclined groove 43 formed thereon; the inclined groove has a connecting portion 43*a* connected to the circumferential main grooves, a wide-width portion 43*b* connected to the connecting portion, and a narrow-width portion 43*c* connected to the wide-width portion; the wide-width portion and the narrow-width portion have inclination angles with respect to the tire circumferential direction smaller than the connecting portion; the blocks have a sipe 52*a* formed thereon, the sipe having one end opening to the connecting portion and the other end opening to the circumferential main grooves; and the sipe has a bent portion.

14 Claims, 2 Drawing Sheets

(51) Int. Cl.
  *B60C 11/13* (2006.01)
  *B60C 11/03* (2006.01)
(52) U.S. Cl.
  CPC ............ *B60C 11/11* (2013.01); *B60C 11/12* (2013.01); *B60C 11/1236* (2013.01); *B60C 11/1307* (2013.01); *B60C 11/0311* (2013.01); *B60C 11/1353* (2013.01); *B60C 11/1384* (2013.01); *B60C 11/1392* (2013.01); *B60C 2011/0341* (2013.01); *B60C 2011/0344* (2013.01); *B60C 2011/0346* (2013.01); *B60C 2011/0374* (2013.01); *B60C 2011/0376* (2013.01); *B60C 2011/0381* (2013.01); *B60C 2011/0383* (2013.01); *B60C 2011/133* (2013.01); *B60C 2011/1338* (2013.01); *B60C 2200/14* (2013.01)

(58) Field of Classification Search
  CPC ............ B60C 11/1384; B60C 11/1392; B60C 2011/0346; B60C 2011/0374; B60C 2011/0376; B60C 2011/0381; B60C 2011/0383; B60C 2011/133; B60C 2011/1338
  See application file for complete search history.

(56) References Cited

U.S. PATENT DOCUMENTS

| | | |
|---|---|---|
| 2003/0192634 A1 | 10/2003 | Hino |
| 2007/0131324 A1* | 6/2007 | Fujita ................. B60C 11/0302 152/209.18 |
| 2011/0277894 A1 | 11/2011 | Takahashi et al. |
| 2012/0273105 A1* | 11/2012 | Ducci .................... B60C 11/13 152/209.18 |
| 2013/0240103 A1 | 9/2013 | Maehara |
| 2013/0333816 A1 | 12/2013 | Oono |

FOREIGN PATENT DOCUMENTS

| | | |
|---|---|---|
| CN | 101992658 A | 3/2011 |
| CN | 205706010 U | 11/2016 |
| EP | 0728599 A1 | 8/1996 |
| EP | 1676725 A1 | 7/2006 |
| EP | 1695844 A1 * | 8/2006 |
| EP | 1695844 A1 | 8/2006 |
| EP | 1818189 A1 | 8/2007 |
| EP | 2289714 A1 | 3/2011 |
| JP | 58-177703 A * | 10/1983 |
| JP | 02-179508 A * | 7/1990 |
| JP | H08290707 A | 11/1996 |
| JP | 2000280713 A | 10/2000 |
| JP | 2002029222 A | 1/2002 |
| JP | 2003011616 A | 1/2003 |
| JP | 2003063211 A | 3/2003 |
| JP | 2003515486 A | 5/2003 |
| JP | 2003211921 A | 7/2003 |
| JP | 2003341306 A | 12/2003 |
| JP | 2008105615 A | 5/2008 |
| JP | 2008137574 A | 6/2008 |
| JP | 2011042328 A | 3/2011 |
| JP | 2011235853 A | 11/2011 |
| JP | 2012106532 A | 6/2012 |
| JP | 2013193463 A | 9/2013 |
| JP | 2014097725 A | 5/2014 |
| JP | 2014180910 A | 9/2014 |
| WO | 2006059560 A1 | 6/2006 |
| WO | 2012043036 A1 | 4/2012 |
| WO | 2012118148 A1 | 9/2012 |

OTHER PUBLICATIONS

Translation for Japan 02-179508 (Year: 2020).*
Machine translation for Japan 58-177703 (Year: 2020).*
Jul. 19, 2016, International Search Report issued in the International Patent Application No. PCT/JP2016/002176.
Jun. 26, 2017, Search Result of Office Action issued by the State Intellectual Property Office in the corresponding Chinese Patent Application No. 201610390401.1.
Jun. 4, 2018, Extended European Search Report issued by the European Patent Office in the corresponding European Patent Application No. 16802738.1.

* cited by examiner

PNEUMATIC TIRE

TECHNICAL FIELD

This disclosure relates to a pneumatic tire.

The present application claims the priority based on Japanese Patent Application No. 2015-113393 filed on Jun. 3, 2015, and Japanese Patent Application No. 2015-113382 filed on Jun. 3, 2015, the entire contents of which are incorporated herein by reference.

BACKGROUND

Conventionally, as a tread pattern achieving both the drainage performance and the off-road running performance of a tire, known is a pattern having circumferential main grooves extending continuously in a zigzag shape in a tire circumferential direction (see, e.g., JP2011-235853A (PTL1)). According to such tread pattern, it is possible to improve the drainage performance due to a tire circumferential component, and yet to ensure the traction performance due to an edge effect of a widthwise component of the circumferential main grooves. Among tires having such tread pattern as described in PTL1, there is a tire of which the a ratio of the tire widthwise component of the circumferential main grooves is enlarged in order to ensure the traction performance on bad road such as swampy ground, gravel road and snowy road.

CITATION LIST

Patent Literature

PTL1: JP2011-235853A

SUMMARY

Technical Problem

According to PTL1, a tire with an enlarged ratio of the tire widthwise component of the circumferential main grooves tends to have a larger vehicle exterior noise. Recently, reduction of pass-by noise on vehicles running in urban area, etc. is highly required, and also, in a tire with high drainage performance and traction performance on bad road such as swampy ground, gravel road and snowy road, a method for improving the wear resistance and improving the silence is required as well.

This disclosure aims to provide a pneumatic tire capable of maintaining high drainage performance and traction performance, while improving the wear resistance and improving the silence.

Solution to Problem

A summary of this disclosure is as follows.

The pneumatic tire of this disclosure, on a tread surface, one or more land portions sandwiched by a plurality of circumferential main grooves extending in a tire circumferential direction, wherein:

the land portion is partitioned into a plurality of blocks by lateral grooves, both ends of the lateral groove open to the plurality of circumferential main grooves sandwiching the land portion;

the block has an inclined groove formed thereon, the inclined groove having one end opening to the circumferential main groove and the other end terminating within the block, and, in a developed view of the tread surface, extending in a manner inclined with respect to the tire circumferential direction;

the inclined groove has a connecting portion connected to the circumferential main groove, a wide-width portion connected to the connecting portion, and a narrow-width portion connected to the wide-width portion;

in a developed view of the tread surface, the wide-width portion and the narrow-width portion have smaller inclination angles with respect to the tire circumferential direction as compared to the connecting portion;

the block has a sipe formed thereon, the sipe having one end opening to the connecting portion and the other end opening to the circumferential main groove; and in a developed view of the tread surface, the sipe has a bent portion.

According to the pneumatic tire of this disclosure, it is possible to maintain high drainage performance and traction performance, while improving the wear resistance and the silence.

Here, the "tread surface" refers to the outer circumferential surface around the whole circumference of the tire, which contacts with the road surface when the tire is rotated after being mounted on an applicable rim with a specified air pressure and a load corresponding to the maximum load capability applied. Here, the "applicable rim" refers to an approved rim specified by the standards below in accordance with tire size (the "Design Rim" in the YEAR BOOK of TRA below, and the "Measuring Rim" in the STANDARDS MANUAL of ETRTO below). The "prescribed internal pressure" refers to an air pressure specified by the standards below in accordance with the maximum load capability. The "maximum load capability" refers to the maximum mass that the tire is allowed to bear according to the standards below. The standards are determined by valid industrial standards for the region in which the tire is produced or used, such as the "YEAR BOOK" of "The Tire and Rim Association, Inc. (TRA)" in the United States of America, the "STANDARDS MANUAL" of "The European Tyre and Rim Technical Organisation (ETRTO)" in Europe, and the "JATMA YEAR BOOK" of the "Japan Automobile Tyre Manufacturers Association (JATMA)" in Japan.

The description that the circumferential main grooves are "continuously extending in a tire circumferential direction" means that they extend toward the tire circumferential direction, and is inclusive of the case of extending in a zigzag shape toward the tire circumferential direction and the case of extending in a bent shape toward the tire circumferential direction.

In the pneumatic tire of this disclosure, it is preferable that, in a developed view of the tread surface, a groove width of the wide-width portion is reduced toward the narrow-width portion.

According to this configuration, it is possible to maintain high drainage performance, while improving the block rigidity and further improving the wear resistance performance.

In the pneumatic tire of this disclosure, it is preferable that the block has a chamfer portion on its sidewall positioned on an extension line along an extending direction of the other end of the inclined groove; and in a developed view of the tread surface, the inclined groove extends to a position at which a tire circumferential dimension between the inclined groove and the chamfer portion is 200% or less of a maximum tire circumferential dimension of the block.

According to this configuration, it is possible to maintain high drainage performance, while improving the block rigidity and further improving the wear resistance performance.

In the pneumatic tire of this disclosure, it is preferable that at least one of the circumferential main grooves is formed of a plurality of circumferentially divided main grooves divided in the tire circumferential direction;

the circumferentially divided main groove is configured such that a tire widthwise position of its one-side end in the tire circumferential direction and a tire widthwise position of its other-side end in the tire circumferential direction are different from each other;

between the circumferentially divided main grooves, a connecting groove is arranged in a manner connecting the one-side end of one of the circumferentially divided main grooves and the other-side end of another one of the circumferentially divided main grooves adjacent to the one of the circumferentially divided main grooves in the tire circumferential direction; and a cross-sectional shape of a groove bottom along a tire width direction of the connecting groove is a curved surface.

According to this configuration, it is possible to maintain high drainage performance and traction performance, while improving the silence.

Here, "a tire widthwise position of its one-side end in the tire circumferential direction and a tire widthwise position of its other-side end in the tire circumferential direction are different from each other" means that the one-side end and the other-side end have a part in which they do not overlap each other in the tire width direction.

In the pneumatic tire of this disclosure, it is preferable that the circumferentially divided main groove has a circumferential portion extending in the tire circumferential direction along the tire circumferential direction, and an inclined portion extending in the tire circumferential direction inclined with respect to the tire circumferential direction.

According to this configuration, it is possible to further improve the drainage performance and the traction performance.

In the pneumatic tire of this disclosure, it is preferable that the block is divided into a first block portion and a second block portion by the connecting portion and the sipe.

According to this configuration, it is possible to improve the block rigidity and further improve the wear resistance performance.

In the pneumatic tire of this disclosure, it is preferable that a sidewall on a tire widthwise outer side of the first block portion is located on a tire widthwise outer side with respect to a sidewall on a tire widthwise outer side of the second block portion.

According to this configuration, it is possible to structure further improve the traction performance.

In the pneumatic tire of this disclosure, it is preferable that the first block portion has a tire circumferential dimension reduced toward the tire widthwise outer side.

According to this configuration, it is possible to improve the handling performance and the steering stability.

In the pneumatic tire of this disclosure, it is preferable that in a developed view of the tread surface, a protrusion is formed on one sidewall of the second block portion partitioned by the circumferential main groove.

According to this configuration, it is possible to structure further improve the traction performance.

In the pneumatic tire of this disclosure, it is preferable that in a developed view of the tread surface, a recess is formed on one sidewall of the second block portion partitioned by the circumferential main groove.

According to this configuration, it is possible to structure further improve the traction performance.

In the pneumatic tire of this disclosure, it is preferable that a tire circumferential end of the inclined portion is connected to a lateral groove opening to another one of the circumferential main grooves adjacent to the circumferentially divided main groove in the tire width direction.

According to this configuration, it is possible to structure further improve the traction performance.

In the pneumatic tire of this disclosure, it is preferable that the land portions sandwiching the circumferentially divided main groove each have a sipe extending from the connecting groove.

According to this configuration, it is possible to structure further improve the traction performance.

Advantageous Effect

According to this disclosure, it is possible to provide a pneumatic tire capable of maintaining high drainage performance and traction performance, while improving the wear resistance and improving the silence.

DETAILED DESCRIPTION

The following describes embodiments of this disclosure in detail with reference to the drawings.

Figure 1:
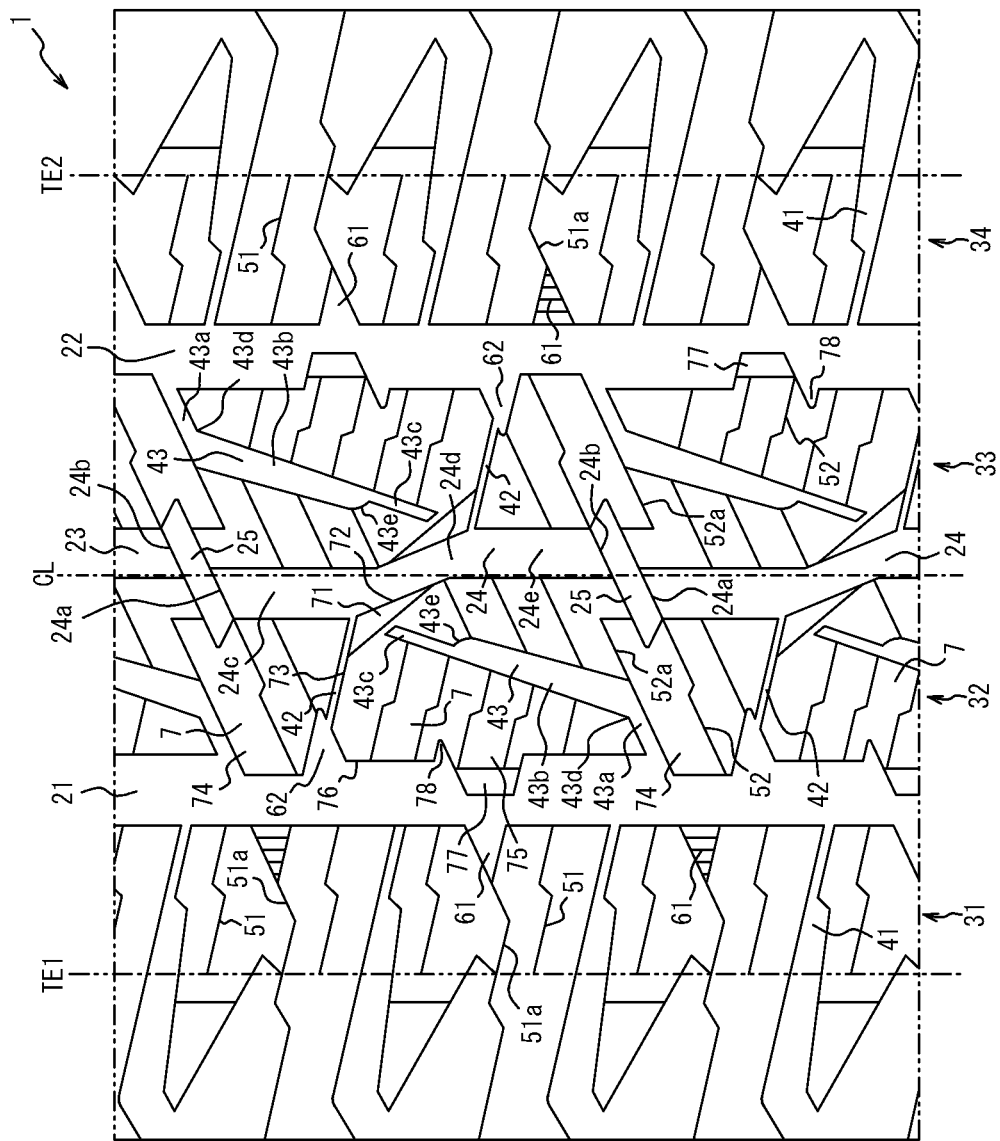
FIG. 1 illustrates a developed view showing a tread pattern of a pneumatic tire according to one embodiment of this disclosure.
Figure 2:
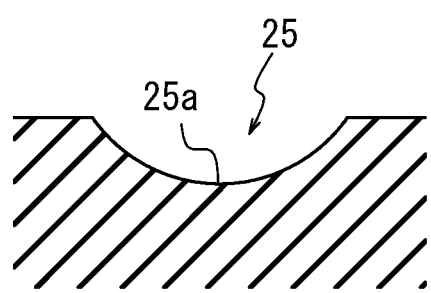
FIG. 2 schematically illustrates a tire widthwise cross section of a groove bottom of a connecting groove in FIG. 1.

FIG. 1 illustrates a developed view showing a tread pattern of a pneumatic tire according to one embodiment of this disclosure (hereinafter referred to as only "tire"), which shows a developed tire tread surface at a state mounted to an applicable rim, filled with a prescribed internal pressure without load applied; and FIG. 2 schematically illustrates a tire widthwise cross section of the groove bottom of the connecting groove in FIG. 1 as mentioned below. Hereinafter, if without specific explanation, the shape and dimensions of the tread pattern are those in the aforementioned state, or in a case of a developed view of the tread surface in the aforementioned state.

As illustrated in FIG. 1, in the tire according to the one embodiment of this disclosure, the tread surface 1 has circumferential main grooves formed thereon, the circumferential main grooves extending in the tire circumferential direction. The example of FIG. 1 has 3 circumferential main grooves 21, 22 and 23, and the circumferential main groove 21 on one tire widthwise outermost side and the circumferential main groove 22 on the other tire widthwise outermost side are formed in a manner extending linearly along the tire circumferential direction. Moreover, in the present embodiment, the circumferential main groove 23 is formed in the vicinity of the tire equatorial plane CL. The circumferential main groove 23 of the present embodiment is formed of a plurality of circumferentially divided main grooves 24 divided in the tire circumferential direction.

In the present embodiment, due to these circumferential main grooves 21, 22 and 23, it is possible to ensure the drainage performance of the tire.

Note that in the embodiment as illustrated in FIG. 1, the circumferential main grooves 21 and 22 on the outermost sides are formed symmetrically centering on a point on the tire equatorial plane CL.

The circumferentially divided main grooves 24 of the present embodiment are formed in a manner such that a tire widthwise position of a one-side end 24a in the tire circumferential direction and a tire widthwise position of an other-side end 24b in the tire circumferential direction are different from each other. Here, "a tire widthwise position of a one-side end in the tire circumferential direction and a tire widthwise position of an other-side end in the tire circumferential direction are different from each other" means that the one-side end and the other-side end have a part in which they do not overlap each other in the tire width direction. As illustrated in FIG. 1, in the present embodiment, the circumferentially divided main grooves 24 are formed in a manner such that the one-side end 24a and the other-side end 24b overlap each other in the tire width direction. In this way, by forming the circumferentially divided main grooves 24 in a manner such that the tire widthwise position of the one-side end 24a in the tire circumferential direction and the tire widthwise position of the other-side end 24b in the tire circumferential direction are different from each other, the traction performance obtained via the circumferentially divided main grooves 24 is improved.

The circumferentially divided main grooves 24 of the present embodiment are formed in a manner including: a first circumferential portion 24c extending in the tire circumferential direction along the tire circumferential direction from the one-side end 24a in the tire circumferential direction; an inclined portion 24d connected to the first circumferential portion 24c and extending in a manner inclined with respect to the tire circumferential direction; and a second circumferential portion 24e connected to the inclined portion 24d and extending in the tire circumferential direction along the tire circumferential direction to the other-side end 24b in the tire circumferential direction. Moreover, in the present embodiment, groove walls of the inclined portion 24d are chamfered and inclined. Therefore, it is possible to improve the block rigidity of the blocks 7, and to thereby improve the wear resistance. Moreover, by inclining the groove walls of the inclined portion 24d, it is possible to improve the drainage performance in the inclined portion 24d, and to increase the shear force during snow obtained with the inclined portion 24d. Therefore, it is possible to further improve the drainage performance and the traction performance.

Here, the description that the first circumferential portion and the second circumferential portion are "extending in the tire circumferential direction along the tire circumferential direction" refers to not only the case of extending in parallel to the tire circumferential direction, but also the case inclined at 5° to 20° with respect to the tire circumferential direction. Moreover, the description that the inclined portion is "extending in the tire circumferential direction in a manner inclined with respect to the tire circumferential direction" refers to a case inclined with respect to the tire circumferential direction more than the first circumferential portion and the second circumferential portion.

In the present embodiment as illustrated in FIG. 1, the first circumferential portion 24c and the second circumferential portion 24e respectively extend in parallel to the tire circumferential direction. Moreover, the inclined portion 24d extends in a manner inclined at 25° with respect to the tire circumferential direction.

By forming the circumferentially divided main grooves 24 in a manner including the circumferential portions 24c, 24e and the inclined portion 24d, it is possible to improve the drainage performance due to the circumferential portions 24c and 24e, and to obtain a large shear force during snow due to the inclined portion 24d with an inclination angle with respect to the tire circumferential direction large than the circumferential portions 24c, 24e, to thereby further improve the traction performance. Therefore, it is possible to further improve the drainage performance and the traction performance.

In the present embodiment, between two circumferentially divided main grooves 24 adjacent to each other in the tire circumferential direction, a connecting groove 25 connecting the one-side end 24a of one circumferentially divided main groove 24 and the other-side end 24b of another circumferentially divided main groove 24 adjacent to this circumferentially divided main groove 24 in the tire circumferential direction is arranged. By connecting two circumferentially divided main grooves 24 with the connecting groove 25, it is possible to maintain high drainage performance, and to improve the silence while maintaining high traction performance even when the ratio of the tire widthwise component of the grooves among the entire tread surface is reduced. As illustrated in FIG. 2, the connecting groove 25 has a groove bottom 25a along the tire width direction of the connecting groove 25 formed into a cross-sectional shape of a curved surface recessed toward a tire widthwise center of the connecting groove 25. Moreover, by forming the cross-sectional shape of the groove bottom 25a along the tire width direction of the connecting groove 25 into a curved surface, the traction performance is further improved.

As illustrated in FIG. 1, in the present embodiment, as mentioned above, the circumferentially divided main grooves 24 are formed in a manner such that the one-side end 24a and the other-side end 24b overlap each other in the tire width direction. Therefore, in the tread pattern of the present embodiment, between two adjacent circumferentially divided main grooves 24, a flow path extending in the tire circumferential direction is ensured due to the connecting groove 25, and thus it is possible to ensure sufficient drainage performance. Note that from the viewpoint of ensuring the drainage performance, if the one-side end 24a of one circumferentially divided main groove 24 and the other-side end 24b of another adjacent circumferentially divided main groove 24 are separated from each other in the tire width direction at a distance larger than the tire widthwise dimensions of the circumferentially divided main grooves 24 at the one-side end 24a and the other-side end 24b, the one-side end 24a and the other-side end 24b do not have to overlap each other in the tire width direction.

By varying the tire widthwise positions of the one-side end 24a and the other-side end 24b of the circumferentially divided main groove 24, connecting two adjacent circumferentially divided main grooves 24 with the connecting groove 25, and forming the cross-sectional shape of the groove bottom 25a along the tire width direction of the connecting groove 25 into a curved surface, it is possible to maintain high traction performance, and reduce the ratio of the tire widthwise component of the grooves among the entire tread surface, to thereby improve the silence.

As illustrated in FIG. 1, in the present embodiment, a plurality of land portions are partitioned by the 3 circumferential main grooves 21, 22, 23 and tread surface edges TE1, TE2. Specifically, an outer land portion 31 on one tire widthwise side is partitioned by the circumferential main groove 21 and the tread surface edge TE1 on the one tire widthwise side; an intermediate land portion 32 on the one tire widthwise side is partitioned by the circumferential main groove 21 and the circumferential main groove 23; an intermediate land portion 33 on the other tire widthwise side is partitioned by the circumferential main groove 23 and the circumferential main groove 22; and an outer land portion 34 on the other tire widthwise side is partitioned by the circumferential main groove 22 and the tread surface edge TE2 on the other side.

In the illustrated example, the outer land portion 31 and the outer land portion 34 are formed so as to have equal tire widthwise dimensions. Moreover, the intermediate land portion 32 and the intermediate land portion 33 are formed so as to have equal tire widthwise dimensions.

The outer land portion 31 of the present embodiment has a lug groove 41 formed thereon, the lug groove 41 having one end opening to the tread surface edge TE1 and the other end opening to the circumferential main groove 21. In the present embodiment, the outer land portion 31 further has a recess 61 formed thereon, the recess 61 recessed toward the tire widthwise outer side on a sidewall partitioned by the circumferential main groove 21. By disposing the recess 61, it is possible to increase the obtained shear force during snow, and to improve the traction performance. A bottom portion of a part of the recesses 61 is formed into a stepwise shape in a manner such that its tire radial dimension increases toward the circumferential main groove 21. By setting the bottom portion into a stepwise shape, it is possible to increase the edge component, and to thereby further improve the traction performance. Note that it is possible to either form the bottom portion of all the recesses 61 into a stepwise shape or not.

The outer land portion 31 of the present embodiment further has a plurality of sipes 51 formed thereon, the plurality of sipes 51 having one end opening to the tread surface edge TE1 and the other end opening to the circumferential main groove 21. In the present embodiment, the sipes 51 have a bending point. In the present embodiment, a part of sipes 51a formed on the outer land portion 31 open to the circumferential main groove 21 via the recesses 61.

The term "sipe" refers to a thin incision, incised inward from the outer surface of the land portion, that can close during ground contact.

In the present embodiment, on the outer land portion 34 on the other side, the lug grooves 41, the sipes 51 and the recesses 61 are formed with the same configuration as the outer land portion 31 on the one side. Specifically, on the outer land portion 34, the lug grooves 41 and the sipes 51 have one end opening to the tread surface edge TE2 and the other end opening to the circumferential main groove 22 (a part of the sipes 51a open to the circumferential main groove 22 via the recesses 61). The recesses 61 are formed in a manner recessed to the tire widthwise outer side on a sidewall of the outer land portion 34 partitioned by the circumferential main groove 22.

In the present embodiment, the intermediate land portion 32 sandwiched by the circumferential main grooves 21 and 23 has a plurality of blocks 7 formed thereon, the blocks 7 partitioned by a lateral groove 42 having both ends opening to the circumferential main grooves 21 and 23. In the present embodiment, the lateral groove 42 is formed in a manner inclined at 75° with respect to the tire circumferential direction. Note that the lateral groove 42 may be inclined at 30° to 90° with respect to the tire circumferential direction.

The lateral groove 42 of the present embodiment opens to a connecting portion of the first circumferential portion 24c and the inclined portion 24d of the circumferentially divided main grooves 24. In other words, one tire circumferential end of the inclined portion 24d is connected to the lateral groove 42 opening to another circumferential main groove 21 adjacent to the circumferentially divided main grooves 24 in the tire width direction. According to such configuration, due to the portion at which the inclined portion 24d and the lateral groove 42 are connected to each other, it is possible to obtain a large shear force during snow, and thus it is possible to further improve the traction performance.

In the present embodiment, the intermediate land portion 32 further has a recess 62 formed thereon, the recess 62 recessed toward the tire widthwise inner side on a sidewall partitioned by the circumferential main groove 21. The lateral groove 42 opens to the circumferential main groove 21 via the recess 62. By disposing the recess 62, it is possible to increase the obtained shear force during snow, and to improve the traction performance.

The blocks 7 of the present embodiment has an inclined groove 43 formed thereon, the inclined groove 43 extending in a manner inclined with respect to the tire circumferential direction. The inclined groove 43 of the present embodiment is formed with one end opening to the circumferential main groove 21 and the other end terminating within the blocks 7. By disposing such inclined groove 43, it is possible to improve the drainage performance. Moreover, the inclined groove 43 of the present embodiment is formed including: a connecting portion 43a with one end connected to one of the circumferential main grooves; a wide-width portion 43b with one end connected to the other end of the connecting portion 43a; and a narrow-width portion 43c with one end connected to the other end of the wide-width portion 43b and the other end terminating within the blocks 7.

In the present embodiment, the wide-width portion 43b and the narrow-width portion 43c are formed in a manner such that the angle at which the extending directions of the wide-width portion 43b and the narrow-width portion 43c are inclined with respect to the tire circumferential direction is smaller than the angle at which the extending direction of the connecting portion 43a is inclined with respect to the tire circumferential direction. Due to such angular correlation, it is possible to reduce a pattern noise due to the inclined groove 43, and to thereby improve the silence performance. In particular, in the present embodiment, the groove walls on the tire widthwise outer side of the wide-width portion 43b and the narrow-width portion 43c are formed integrally without a difference in level. Note that the angles at which the extending directions of the wide-width portion 43b and the narrow-width portion 43c are inclined with respect to the tire circumferential direction may be 5° to 45°. Moreover, the angle at which the extending direction of the connecting portion 43a is inclined with respect to the tire circumferential direction may be 30° to 90°.

In the present embodiment, as illustrated in FIG. 1, in a developed view of the tread surface, the wide-width portion 43b is formed with a groove width reduced toward the narrow-width portion 43c. By forming the wide-width portion 43b in this way, it is possible to maintain the drainage performance, while improving the block rigidity and the wear resistance. Note that in the present embodiment, the connecting portion 43a and the narrow-width portion 43c are formed with constant groove widths. Moreover, in the present embodiment, the wide-width portion 43b is formed with a groove width larger than the connecting portion 43a.

In the present embodiment, the wide-width portion 43b may be formed in a manner such that the dimension in the extending direction of the wide-width portion 43b is within a range of 25% to 2000% of the dimension in the extending direction of the connecting portion 43a. Moreover, the narrow-width portion 43c may be formed in a manner such that the dimension in the extending direction of the narrow-width portion 43c is within a range of 5% to 2000% of the dimension in the extending direction of the connecting portion 43a.

Here, the dimensions in the extending directions of the connecting portion 43a, the wide-width portion 43b and the narrow-width portion 43c refer to average values of the dimensions on the tread surface in the extending directions of respectively two groove walls of the connecting portion 43a, the wide-width portion 43b and the narrow-width portion 43c.

In the present embodiment, the blocks 7 have a chamfer portion 71 in which the sidewall in an extension line of the extending direction of the other end of the inclined grooves 43 is chamfered. More specifically, the chamfer portion 71 is formed in a manner such that the sidewall on the extension line of the extending direction of the end on the side of the narrow-width portion 43c, which is not connected to the wide-width portion 43b of the inclined grooves 43, is chamfered. In particular, in the present embodiment, the narrow-width portion 43c of the inclined groove 43 extends toward the connecting portion of the circumferentially divided main groove 24 and the lateral grooves 42, and the chamfer portion 71 is formed on a portion from a sidewall 72 partitioned by the inclined portion 24d of the circumferentially divided main grooves 24 to a sidewall 73 partitioned by the lateral groove 42. Note that in the present embodiment, due to formation of the chamfer portion 71, the groove walls of the inclined portion 24d of the circumferentially divided main grooves 24 are chamfered and inclined. Therefore, it is possible to improve the block rigidity of the blocks 7, and to thereby improve the wear resistance.

In the present embodiment, as illustrated in the one embodiment in FIG. 1, in a developed view of the tread surface, the inclined groove 43 extends to a position at which the tire circumferential dimension between the inclined groove 43 and the chamfer portion 71 is 200% or less of the maximum tire circumferential dimension of the blocks 7. According to such configuration, by forming the chamfer portion 71, the groove walls of the inclined portion 24d of the circumferentially divided main grooves 24 are inclined. Thereby, it is possible to improve the block rigidity of the blocks 7, and to improve the wear resistance. Moreover, since the extension length of the inclined groove 43 can be increased, it is possible to improve the drainage performance due to the inclined grooves 43.

In the present embodiment, in a developed view of the tread surface in FIG. 1, the narrow-width portion 43c of the inclined grooves 43 extends to a position at which the tire circumferential dimension between the narrow-width portion 43c and the chamfer portion 71 of the inclined grooves 43 is 75% or less of a maximum tire circumferential dimension of the blocks 7. According to such configuration, it is possible to improve the drainage performance due to the inclined grooves.

In the present embodiment, the blocks 7 further have a plurality of sipes 52 formed thereon. Among the plurality of sipes 52, a sipe 52a is formed with one end opening to the connecting portion 43a of the inclined grooves 43. In the present embodiment, in a developed view of the tread surface, the sipe 52a has a bent portion. Therefore, it is possible to increase the edge component, and to thereby improve the traction performance. In particular, in the present embodiment, the other end of the sipe 52a opens to the connecting grooves 25 connecting the circumferentially divided main grooves 24. Therefore, in the present embodiment, the blocks 7 are divided into a first block portion 74 and a second block portion 75 by the connecting portion 43a and the sipe 52a. In the present embodiment, since the sipe 52a opens to the connecting groove 25 connecting the circumferentially divided main grooves 24, it is possible to improve the drainage performance. Moreover, by dividing the blocks 7 into a first block portion 74 and a second block portion 75, it is possible to suppress the stress concentration in a part of the blocks 7, and to thereby improve the block rigidity and improve the wear resistance.

Moreover, since the sipe 52a has a bent portion, the two parts divided by the connecting portion 43a and the sipe 52a support each other when exerted with a side force, etc. and are deformed in a collapsing way. Therefore, it is possible to suppress concentration of a large stress in one part divided by the connecting portion 43a and the sipe 52a, and to thereby improve the wear resistance.

Moreover, since the intermediate land portions 32 and 33 sandwiching the circumferentially divided main grooves 24 have the sipe 52a formed thereon, the sipe 52a extending from the connecting groove 25, it is possible to interlock the movement of the intermediate land portions 32 and 33 with each other. Furthermore, an edge effect is obtained by disposing the sipe, and thus it is possible to further improve the traction performance.

According to the tire of the one embodiment of this disclosure, first, the intermediate land portions 32 and 33 has a plurality of blocks 7 formed thereon, the blocks 7 partitioned by the lateral groove 42 of which both ends open to the plurality of circumferential main grooves 21, 22 and 23 opening to the intermediate land portions 32 and 33; and the blocks 7 have the inclined groove 43 formed thereon, the inclined groove 43 having one end opening to the circumferential main grooves 21 and 22 and the other end terminating within the blocks 7, and extending in a manner inclined with respect to the tire circumferential direction in a developed view of the tread surface. By disposing such inclined groove 43, it is possible to improve the drainage performance. Moreover, the inclined groove 43 includes a connecting portion 43a connecting the circumferential main grooves 21 and 22, a wide-width portion 43b connected to the connecting portion 43a, and a narrow-width portion 43c connected to the wide-width portion 43b; and in a developed view of the tread surface, the wide-width portion 43b and the narrow-width portion 43c are formed with inclination angles with respect to the tire circumferential direction smaller than the connecting portion 43a. With such angular correlation, it is possible to reduce a pattern noise due to the inclined groove 43, and to thereby improve the silence performance. Further, the blocks 7 have the sipe 52a formed thereon, the sipe 52a having one end opening to the connecting portion 43a and the other end opening to the circumferential main groove 23; and in a developed view of the tread surface, the sipe 52a has a bent portion. Therefore, it is possible to increase the edge component and to thereby improve the traction performance. Furthermore, the two parts divided by the sipe 52a support each other when exerted with a side force, etc. and are deformed in a collapsing way. Therefore, it is possible to suppress concentration of a large stress in one part divided by the sipe 52a, and to thereby improve the wear resistance. Therefore, it is possible to maintain high drainage performance and traction performance, while improving the wear resistance and the silence.

As illustrated in FIG. 1, in the present embodiment, the sidewall on the tire widthwise outer side of the first block portion 74, except for a protrusion 77 mentioned below, is formed in a manner located on a tire widthwise side outer than the sidewall on the tire widthwise outer side of the second block portion 75. Such configuration generates a region without existence of blocks on a tire circumferential line of the sidewall on the tire widthwise outer side of the second block portion 75 and on a tire circumferential line of the sidewall on the tire widthwise outer side of the first block portion 74, and thereby improves the traction performance.

In the present embodiment, the first block portion 74 is formed with a tire circumferential dimension reduced toward the tire widthwise outer side. Such configuration diversifies the directionality of the edge component obtained via the first block portion 74, and thus it is possible to improve the handling performance and the steering stability.

In the present embodiment, in a developed view of the tread surface, a protrusion 77 is formed on a sidewall 76 of the second block portion 75 partitioned by the circumferential main groove 21. By forming the protrusion 77, the shear force during snow obtained via formation of a region with a narrow groove width of the circumferential main groove 21 is increased, and thus it is possible to improve the traction performance.

In the present embodiment, in a developed view of the tread surface, a recess 78 is formed on the sidewall 76 of the second block portion 75 partitioned by the circumferential main groove 21. By forming the recess 78, a shear force during snow is obtained within the recess 78, and thus it is possible to improve the traction performance.

In the present embodiment, in a developed view of the tread surface, the connecting groove 25 is arranged in a manner adjacent to the sidewall 76 of the first block portion 74 partitioned by the circumferentially divided main groove 24 in the tire circumferential direction. By arranging the connecting groove 25 in this way, it is possible to increase the obtained shear force during snow, and to thereby improve the traction performance. Therefore, it is possible to maintain high drainage performance and traction performance, while further improving the silence.

In the present embodiment, the intermediate land portion 33 on the other side has the lateral groove 42, the inclined groove 43, the sipes 52, the recess 62, the protrusion 77 and the recess 78 formed thereon. Specifically, on the intermediate land portion 33 on the other side, the lateral groove 42 opens to the circumferential main grooves 22 and 23, the inclined groove 43 opens to the circumferential main groove 22, and the sipe 52a among the plurality of sipes 52 opens to the circumferential main groove 22 and the connecting groove 25. Moreover, the recess 62, the protrusion 77 and the recess 78 are formed on the sidewall on the circumferential main groove 22 side.

In particular, in the present embodiment, the intermediate land portion 33 is formed symmetrically to the intermediate land portion 32 centering on a point on the tire equatorial plane CL.

In the illustrated example, in a developed view of the tread surface, at least one groove wall of the inclined groove 43 (both groove walls as for the illustrated example) is bent between the connecting portion 43a and the wide-width portion 43b. In other words, it has a bent portion 43d between the connecting portion 43a and the wide-width portion 43b.

Moreover, in the illustrated example, in a developed view of the tread surface, at least one groove wall of the inclined groove 43 (one groove wall as for the illustrated example) is curved at the end portion on the narrow-width portion 43c side in the wide-width portion 43b. In other words, it has a curved portion 43e on the end portion on the narrow-width portion 43c side in the wide-width portion 43b.

These configurations lead to improvement of the drainage performance, the traction performance, the wear resistance and the silence.

A preferable embodiment of this disclosure has been described above, while this disclosure is not limited thereto. For example, 2 or 4 or more circumferential main grooves may be formed on the tread surface. Other modifications or variations may be used as well.

EXAMPLES

Examples 1 to 9 and Comparative Examples 1, 2

In order to confirm the effect of this disclosure, the tires according to Examples 1 to 9 and the tires according to Comparative Examples 1 and 2 were produced experimentally, and were subjected to tests for evaluating the performances of the tires. The details of each tire are as shown in the following Table 1. The tests were performed by mounting each aforementioned tire of a tire size of 215/55R17 to an applicable rim, setting the internal pressure to 230 kPa, and installing the same to a vehicle. Note that as illustrated in FIG. 1, each tire is a tire having on the tread surface 1 three circumferential main grooves 21, 22 and 23 extending in the tread circumferential direction.

<Traction Test>

The traction test was performed by measuring the tractive force of each aforementioned tire at the time of running at a speed of 5 km/h on an agricultural field (muddy ground). The evaluation was performed with a relative value with the evaluation result of the tire according to Comparative Example 1 as 100, where a larger value indicates better traction performance.

<Silence Test>

At a speed for hour of 80 km/h, the tire side sound of each aforementioned tire when travelling on an indoor drum testing machine was measured at the conditions as defined in JASO C606 standard, and the air column resonance sound was evaluated. The evaluation was performed with a relative value with the evaluation result of the tire according to Comparative Example 1 as 100, where a larger value indicates better silence.

<Drainage Performance Test>

A braking distance of each aforementioned tire from a speed for hour of 80 km/h until braking to standstill was measured by running on a wet road surface with a water depth of 6 mm on a test course. The evaluation was performed with a reciprocal of a ratio of the braking distance with the evaluation result of the tire according to Comparative Example 1 as 100, where a larger value indicates better drainage performance.

<Wear Test>

The wear test was performed by measuring a rubber volume of the disappearing lugs due to heel-and-toe wear on each aforementioned tire after running for 20000 km at a speed of 40 km/h on a concrete road surface. The evaluation was performed with a relative value with the evaluation result of the tire according to Comparative Example 1 as 100, where a larger value indicates better wear resistance.

<Steering Stability Test>

The travelling performance of each aforementioned tire when travelling on dry road surface was evaluated via the senses of the driver. The evaluation was performed with a relative value with the evaluation result of the tire according to Comparative Example 1 as 100, where a larger value indicates better steering stability.

TABLE 1

|  | Example 1 | Example 2 | Example 3 | Example 4 | Example 5 | Example 6 |
|---|---|---|---|---|---|---|
| Sipe 52a | Present | Present | Present | Present | Present | Present |
| Inclination, with respect to tire circumferential direction, of wide-width portion 43b and narrow-width portion 43c | 20 | 20 | 20 | 20 | 20 | 20 |
| Inclination, with respect to tire circumferential direction, of connecting portion 43a | 65 | 65 | 65 | 65 | 65 | 65 |
| Groove width of wide-width portion 43b | Reduced toward narrow-width portion 43c | Reduced toward narrow-width portion 43c | Reduced toward narrow-width portion 43c | Reduced toward narrow-width portion 43c | Reduced toward narrow-width portion 43c | Reduced toward narrow-width portion 43c |
| Chamfer portion 71 | Present | Present | Present | Present | Present | Present |
| Whether blocks 7 are divided | Divided | Divided | Divided | Divided | Divided | Divided |
| Positions of sidewalls on tire widthwise outer side of first and second block portions | First block portion on outer side | First block portion on outer side | First block portion on outer side | First block portion on outer side | First block portion on outer side | First block portion on outer side |
| Tire circumferential dimension of first block portion 74 | Smaller on tire widthwise outer side | Smaller on tire widthwise outer side | Smaller on tire widthwise outer side | Smaller on tire widthwise outer side | Constant | — |
| Protrusion 77 | Present | Present | Present | Absent | Absent | — |
| Recess 78 | Present | Present | Absent | Absent | Absent | — |
| Circumferential main groove 23 | Divided in circumferential direction | Continuous in circumferential direction | Continuous in circumferential direction | Continuous in circumferential direction | Continuous in circumferential direction | Continuous in circumferential direction |
| Traction test | 115 | 115 | 112 | 108 | 105 | 102 |
| Silence test | 114 | 114 | 114 | 114 | 114 | 114 |
| Drainage performance test | 110 | 110 | 110 | 110 | 110 | 110 |
| Wear test | 116 | 116 | 116 | 116 | 116 | 116 |
| Steering stability test | 112 | 112 | 112 | 112 | 110 | 108 |

|  | Example 7 | Example 8 | Example 9 | Comparative Example 1 | Comparative Example 2 |
|---|---|---|---|---|---|
| Sipe 52a | Present | Present | Present | Present | Absent |
| Inclination, with respect to tire circumferential direction, of wide-width portion 43b and narrow-width portion 43c | 20 | 20 | 20 | 60 | 60 |
| Inclination, with respect to tire circumferential direction, of connecting portion 43a | 65 | 65 | 65 | 20 | 20 |
| Groove width of wide-width portion 43b | Reduced toward narrow-width portion 43c | Reduced toward narrow-width portion 43c | Constant | Constant | Constant |
| Chamfer portion 71 | Present | Absent | Absent | Absent | Absent |
| Whether blocks 7 are divided | Not divided | Not divided | Not divided | Not divided | Not divided |
| Positions of sidewalls on tire widthwise outer side of first and second block portions | — | — | — | — | — |
| Tire circumferential dimension of first block portion 74 | — | — | — | — | — |
| Protrusion 77 | — | — | — | — | — |
| Recess 78 | — | — | — | — | — |
| Circumferential main groove 23 | Continuous in circumferential direction | Continuous in circumferential direction | Continuous in circumferential direction | Continuous in circumferential direction | Continuous in circumferential direction |
| Traction test | 100 | 97 | 97 | 100 | 98 |
| Silence test | 114 | 114 | 114 | 100 | 97 |
| Drainage performance test | 110 | 107 | 103 | 100 | 100 |
| Wear test | 113 | 114 | 115 | 100 | 97 |
| Steering stability test | 108 | 107 | 107 | 100 | 100 |

As shown in Table 1, it is understood that as compared to the tires according to Comparative Examples 1 and 2, each of the tires according to Examples 1 to 9 improves the wear resistance and the steering stability, and improves the silence, while maintaining high drainage performance and traction performance

[Tires 1 to 8]

The Tires 1 to 8 were produced experimentally, and in order to evaluate the performances of each tire, the aforementioned traction test, silence test and drainage performance test were performed. The dimensions of the Tires 1 to 8 are as shown in Table 2 in the following. The tests were performed by mounting the Tires 1 to 8 of a tire size of 215/55R17 to an applicable rim, setting the internal pressure to 230 kPa, and installing the same to a vehicle.

Note that in Table 2, the values of the traction test, the silence test and the drainage performance test of each tire are calculated with the evaluation result of Tire 6 as 100.

Note that as illustrated in FIG. 1, the Tires 1 to 8 are tires having on the tread surface 1 three circumferential main grooves 21, 22 and 23 extending in the tread circumferential direction.

TABLE 2

| | Tire 1 | Tire 2 | Tire 3 | Tire 4 | Tire 5 | Tire 6 | Tire 7 | Tire 8 |
|---|---|---|---|---|---|---|---|---|
| Circumferential main groove 23 | Divided in circumferential direction | Divided in circumferential direction | Divided in circumferential direction | Divided in circumferential direction | Divided in circumferential direction | Continuous in circumferential direction (zigzag) | Divided in circumferential direction | Divided in circumferential direction |
| Connecting groove 25 | Present | Present | Present | Present | Present | — | Absent | Present |
| Widthwise cross-sectional shape of bottom 25a | Curved | Curved | Curved | Curved | Curved | — | — | Flat |
| Configuration of circumferentially divided main grooves 24 | Circumferential portion and inclined portion | Circumferential portion and inclined portion | Circumferential portion and inclined portion | Circumferential portion and inclined portion | Only inclined portion | — | Only inclined portion | Only inclined portion |
| Groove wall of inclined portion 24d | Chamfered | Chamfered | Chamfered | Not chamfered | Not chamfered | — | Not chamfered | Not chamfered |
| Circumferential end of inclined portion 24d | Connected to lateral groove 42 | Connected to lateral groove 42 | Not connected to lateral groove 42 | Not connected to lateral groove 42 | — | — | — | — |
| Sipe 52a | Present | Absent | Absent | Absent | Absent | Absent | Absent | Absent |
| Traction test | 115 | 115 | 115 | 115 | 113 | 100 | 103 | 105 |
| Silence test | 110 | 108 | 105 | 103 | 103 | 100 | 95 | 95 |
| Drainage performance test | 105 | 103 | 103 | 100 | 100 | 100 | 90 | 90 |

As shown in Table 2, it is understood that as compared to the Tires 6 to 8, each of the Tires 1 to 5 maintains high drainage performance and traction performance, while improving the silence.

INDUSTRIAL APPLICABILITY

According to this disclosure, it is possible to provide a pneumatic tire capable of maintaining high drainage performance and traction performance, while improving the wear resistance and improving the silence.

REFERENCE SIGNS LIST

1 tread surface
21, 22, 23 circumferential main groove
24 circumferentially divided main groove
24a one-side end
24b other-side end
24c first circumferential portion
24d inclined portion
24e second circumferential portion
25 connecting groove
25a groove bottom
31 outer land portion
32 intermediate land portion
33 intermediate land portion
34 outer land portion
41 lug groove
42 lateral groove
43 inclined groove
43a connecting portion
43b wide-width portion
43c narrow-width portion
43d bent portion
43e curved portion
51, 52, 52a sipe
61, 62 recess
7 block
71 chamfer portion
72, 73 sidewall
74 first block portion
75 second block portion
76 sidewall
77 protrusion
78 recess
CL tire equatorial plane
TE1, TE2 tread edge

The invention claimed is:

1. A pneumatic tire comprising, on a tread surface, one or more land portions sandwiched by a plurality of circumferential main grooves extending in a tire circumferential direction, wherein:
 each land portion is partitioned into a plurality of blocks by lateral grooves, both ends of each lateral groove open to the plurality of circumferential main grooves sandwiching the land portion;
 at least one of the blocks has an inclined groove formed thereon, the inclined groove having one end opening to one of the circumferential main grooves sandwiching the land portion and the other end terminating within the block, and, in a developed view of the tread surface, extending in a manner inclined with respect to the tire circumferential direction;

the inclined groove has a connecting portion connected to the one of the circumferential main grooves sandwiching the land portion, a wide-width portion connected to the connecting portion, and a narrow-width portion connected to the wide-width portion;

in a developed view of the tread surface, the wide-width portion and the narrow-width portion have smaller inclination angles with respect to the tire circumferential direction as compared to the connecting portion;

the at least one of the blocks has a sipe formed thereon, the sipe having one end opening to the connecting portion and the other end opening to the other of the circumferential main grooves sandwiching the land portion;

in a developed view of the tread surface, the sipe has a bent portion;

at least one of the circumferential main grooves is formed of a plurality of circumferentially divided main grooves divided in the tire circumferential direction;

each circumferentially divided main groove is configured such that a tire widthwise position of its one-side end in the tire circumferential direction and a tire widthwise position of its other-side end in the tire circumferential direction are different from each other;

between the circumferentially divided main grooves, a connecting groove is arranged in a manner connecting the one-side end of one of the circumferentially divided main grooves and the other-side end of another one of the circumferentially divided main grooves adjacent to the one of the circumferentially divided main grooves in the tire circumferential direction;

a cross-sectional shape of a groove bottom along a tire width direction of the connecting groove is a curved surface; and each circumferentially divided main groove has a circumferential portion extending in the tire circumferential direction along the tire circumferential direction, and an inclined portion extending in the tire circumferential direction inclined with respect to the tire circumferential direction.

2. The pneumatic tire according to claim 1, wherein:
in a developed view of the tread surface, a groove width of the wide-width portion is reduced toward the narrow-width portion.

3. The pneumatic tire according to claim 2, wherein:
the at least one of the blocks has a chamfer portion on its sidewall positioned on an extension line along an extending direction of the other end of the inclined groove; and
in a developed view of the tread surface, the inclined groove extends to a position at which a tire circumferential dimension between the inclined groove and the chamfer portion is 200% or less of a maximum tire circumferential dimension of the block.

4. The pneumatic tire according to claim 2, wherein:
the at least one of the blocks is divided into a first block portion and a second block portion by the connecting portion and the sipe.

5. The pneumatic tire according to claim 1, wherein:
the at least one of the blocks has a chamfer portion on its sidewall positioned on an extension line along an extending direction of the other end of the inclined groove; and
in a developed view of the tread surface, the inclined groove extends to a position at which a tire circumferential dimension between the inclined groove and the chamfer portion is 200% or less of a maximum tire circumferential dimension of the block.

6. The pneumatic tire according to claim 1, wherein:
the at least one of the blocks is divided into a first block portion and a second block portion by the connecting portion and the sipe.

7. The pneumatic tire according to claim 6, wherein:
a sidewall on a tire widthwise outer side of the first block portion is located on a tire widthwise outer side with respect to a sidewall on a tire widthwise outer side of the second block portion.

8. The pneumatic tire according to claim 7, wherein:
the first block portion has a tire circumferential dimension reduced toward the tire widthwise outer side.

9. The pneumatic tire according to claim 7, wherein:
in a developed view of the tread surface, a protrusion is formed on one sidewall of the second block portion partitioned by the one of the circumferential main grooves sandwiching the land portion.

10. The pneumatic tire according to claim 7, wherein:
in a developed view of the tread surface, a recess is formed on one sidewall of the second block portion partitioned by the one of the circumferential main grooves sandwiching the land portion.

11. The pneumatic tire according to claim 6, wherein:
the first block portion has a tire circumferential dimension reduced toward the tire widthwise outer side.

12. The pneumatic tire according to claim 6, wherein:
in a developed view of the tread surface, a protrusion is formed on one sidewall of the second block portion partitioned by the one of the circumferential main grooves sandwiching the land portion.

13. The pneumatic tire according to claim 6, wherein:
in a developed view of the tread surface, a recess is formed on one sidewall of the second block portion partitioned by the one of the circumferential main grooves sandwiching the land portion.

14. The pneumatic tire according to claim 1, wherein:
two intermediate land portions are formed so as to sandwich each circumferentially divided main groove, and the intermediate land portions each have a sipe extending from the connecting groove.

* * * * *